Oct. 25, 1966 E. L. MORGAN ETAL 3,281,818
SEAT BELT LOCK SIGNAL
Filed May 1, 1964
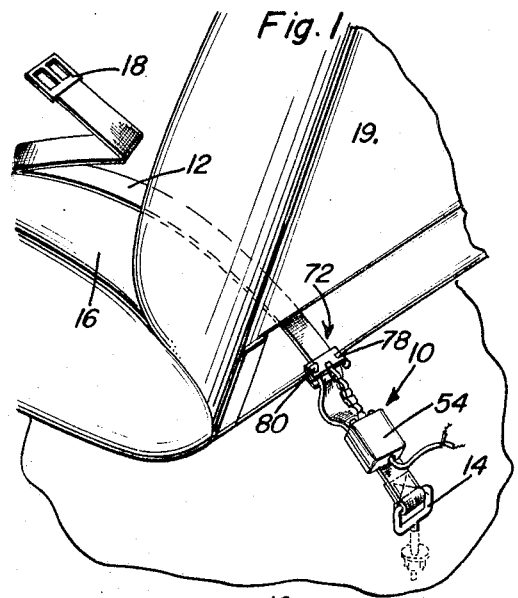
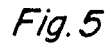
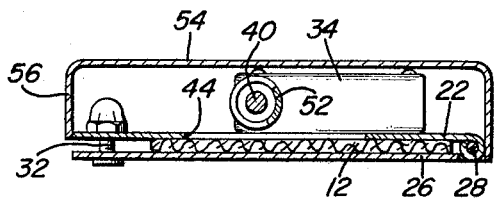
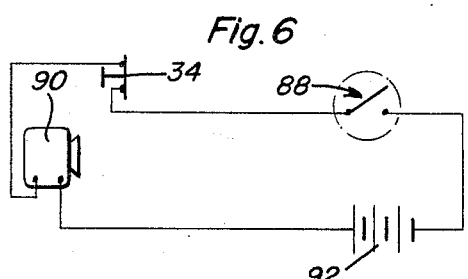
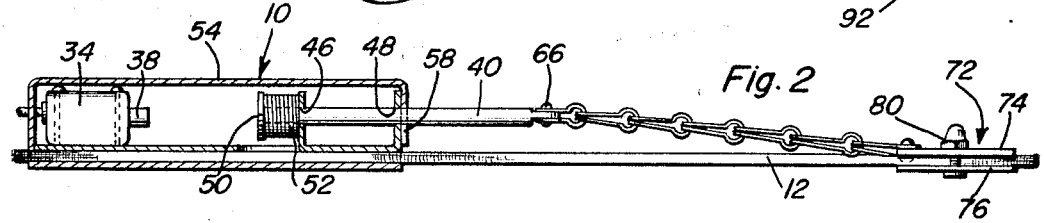
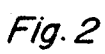
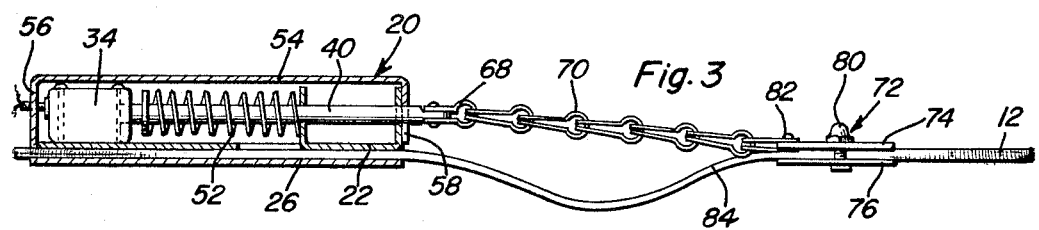
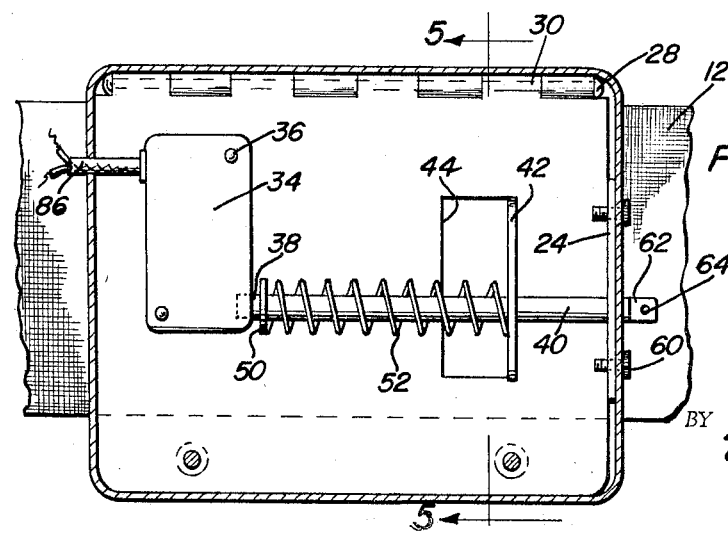
Estes L. Morgan
Seth A. Parish, Jr.
INVENTORS

# United States Patent Office 3,281,818
Patented Oct. 25, 1966

3,281,818
SEAT BELT LOCK SIGNAL
Estes L. Morgan, 217 Hillcrest Drive, Sanford, N.C., and Seth A. Parish, Jr., Raleigh, N.C.; said Parish assignor of one-sixth to said Morgan
Filed May 1, 1964, Ser. No. 364,084
2 Claims. (Cl. 340—278)

The present invention generally relates to novel improvements in seat belt constructions such as those used in various types of vehicles including automobiles and has for its particular purpose the provision of a device for signalling the operator or the passengers in a vehicle that the seat belts are not buckled.

It is well known that the installation and use of seat belts will materially reduce injury and death due to automobile accidents. In view of this, many states have enacted laws to require installation of seat belts in automobiles. However, there is a natural reticence of vehicle operators and passengers in using the seat belts inasmuch as it is rather inconvenient to buckle the seat belt especially when only driving a short distance. Additionally, it sometimes occurs that the seat belts are forgotten when concentrating on other matters such as operating the vehicle in a proper manner. Therefore, it is the main object of the present invention to provide a signalling device which will indicate to the vehicle operator or other passengers that the seat belts are not buckled thus warning the operator or passengers to properly buckle their seat belts.

Another very important object of the present invention is to provide a seat belt lock or buckle signal which is easily attached to existing seat belts without any modification whatsoever of the seat belt structure or the manner in which it is installed in the event the signalling device of the present invention is installed when the seat belts are installed.

A further object of the present invention is to provide a seat belt lock signal which is audible in nature and which is connected into the electrical circuitry of the vehicle so that the signal circuit will be energized only when the ignition switch of the vehicle is in an "on" position.

Yet another important object of the present invention is to provide a seat belt lock signal which is simple in construction, easy to install, effective for signalling and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a partial perspective view of a vehicle seat with a seat belt installed and the lock signal of the present invention incorporated therein;

FIGURE 2 is a longitudinal sectional view of the structure of the present invention illustrating the seat belt and the signalling device when the seat belt is stretched taut which occurs when the buckles are preferably buckled up;

FIGURE 3 is a sectional view similar to FIGURE 2 but illustrating the signalling device and seat belt in the position they assume when the seat belts are not buckled so that the switch forming a part of the signal will be closed;

FIGURE 4 is an enlarged plan view with the cover of the switch assembly broken away for illustrating the structural details of the internal mechanism of the switch operating plunger and spring;

FIGURE 5 is a transverse, sectional view taken substantially upon a plane passing along section line 5—5 of FIGURE 4 illustrating further structural details of the block signal and specifically illustrating the manner in which the lock signal is attached to the seat belt; and FIGURE 6 is a schematic view illustrating an electric circuit employed in the present invention.

Referring now specifically to the drawings, the numeral 10 generally designates the signal lock device of the present invention which is installed on a seat belt 12 of conventional construction which is anchored at its rear end by an anchor member 14 to a structural component of the vehicle such as a frame member or the like. As is conventional, the seat belt 12 extends between the horizontal portion of the seat 16 and the seat back 19 although the present invention may be installed on that type of seat belt which is anchored to the vehicle component alongside of the seat rather than rearwardly thereof. As is conventional, the seat belt 12 is constructed of webbing of a proper strength and the seat belt has a buckle component 18 thereon which is illustrated as a metal-to-metal component but it is pointed out that this invention may also be used with the type of seat belt having a cam lock or other suitable type of lock mechanism in that it is operative in response to the seat belt 12 being connected with a similar seat belt in operative position with the seat belt 12 being stretched into a taut condition.

The signalling device of the present invention includes a hollow housing structure generally designated by numeral 20 which includes a base plate 22 having an upturned partial flange 24 at one edge thereof. Hingedly attached to the base plate 22 at one edge thereof is a clamp or retainer plate 26 which is hingedly attached to the base plate 12 by a hinge pin 28 extending through interdigitated hinge barrel segments 30 which are formed integral respectively with the base plate 22 and the clamp plate 26. At the opposite edge of the base plate 22, there is provided a pair of small fastener bolts or clamp screws 32 which extend through both the base plates 22 and the clamping plate 26 whereby tightening of the clamp screws or bolts 32 will effectively secure the housing 20 on the seat belt 12 in an anchored position as illustrated in FIGURE 5 with no modification whatsoever of the seat belt 12 and the sectional engagement between the relatively large surfaces of the base plate 22 and clamping plate 26 will effectively clamp the housing 22 to the seat belt 12. If desired, the surfaces of either or both of the base plate 12 and clamping plate 26 which engages the seat belt 12 may be roughened by knurling or providing roughness or slight projections on the surfaces to further enhance the frictional engagement with the belt 12. Moreover, if it is desired, the hinge structure 28 and 30 may be eliminated and bolts may be provided on both edges of the base plate and clamp plate for securing the housing 20 to the seat belt in a secure and rigid manner so that the housing 20 will not move on the seat belt 12.

Mounted on the base plate 22 is a microswitch 34 secured in place by suitable fasteners 36 or the like with the microswitch having an operating button 38 projecting from one end portion thereof toward the center of the base plate 22. An elongated plunger 40 engages the button 38 and serves to operate the button 38 in a manner described hereinafter.

The plunger 40 is slidably supported by an upstanding lug 42 which is struck outwardly from the base plate 22 thus leaving an aperture 44 in the base plate 22. The plunger 40 slides through an aperture 46 in the lug 42 and also slides through an aperture 48 in the flange 24 thus forming spaced aligned supports for the plunger 40 so that it will reciprocate in guided alignment with the button 38.

The inner end of the plunger 40 is provided with a flat disk-like head 50 and a coil compression spring 52 is orientated between the disk-like head 50 and the lug 42 thus resiliently biasing the plunger 40 toward the button 38 on the microswitch 34. While a cylindrical coil spring has been illustrated for purposes of convenience and while this type of spring will work effectively, it is also contemplated that other types of springs may be employed for enabling the spring to collapse to a shorter longitudinal length. For example, a spiral coil spring may be employed or an oval-shaped spiral coil spring may be employed. Inasmuch as such springs are commercially available and the fact that they will collapse into a shorter longitudinal length is well known, the various types of springs have not been illustrated.

A cover plate 54 is provided on the housing 20 and the cover plate 54 includes depending peripheral flanges 56, one of which has a slot 58 to pass over the plunger 40. Screw-threaded fasteners 60 extend through the slotted wall of the cover plate 54 and extend into the partial flange 24 thus detachably securing the cover plate in position for concealing the switch mechanism and to protect the switch mechanism from dust, dirt and the like.

The end of the plunger 40 remote from the head 50 is flattened as at 62 and provided with an aperture 64 therethrough receiving a fastener 66 for anchoring a chain line 68 thereto. A plurality of chain links are provided for forming a chain 70 which extends longitudinally along the surface of the seat belt 12. The other end of the chain 70 is attached to a clamp plate assembly generally designated by the numeral 72 and including an upper plate 74 and a lower plate 76 which receives a seat belt 12 therebetween. The plates 74 and 76 are hingedly connected together as at 78 at one edge thereof and the other edge thereof is provided with a clamp bolt assembly 80 similar to the clamp bolt or clamp fastener 32 for securely anchoring the clamp plate assembly 72 to the seat belt 12. The chain 70 is attached to the upper plate 74 by a suitable fastener 82 whereby movement of the clamp plate assembly 72 will cause corresponding movement of the plunger 40. It is pointed out as in connection with the housing 20, the plates 74 and 76 may be roughened and both edges thereof may be provided with clamp bolts or the like.

When installing the lock signal, the housing 20 would be clamped to the seat belt at a convenient location adjacent the anchor 14 or at any point in the seat belt between the ends thereof although it is convenient to have it in an out-of-the-way or concealed position either behind or below the seat structure. After the housing 20 is securely fastened to the seat belt 12, the seat belt 12 is stretched into a taut condition and the clamp plate assembly 72 is pulled outwardly until the plunger 40 is moved outwardly for compressing the spring 52 as in the condition illustrated in FIGURE 2 and then the clamp plate assembly 72 is securely clamped to the seat belt for maintaining the seat belt taut. Then, as soon as the seat belt 12 is released, the spring 52 will move the plunger 40 inwardly thus moving the clamp plate assembly 72 inwardly toward the housing 20 thus forming a slack portion 84 in the seat belt 12 as illustrated in FIGURE 2. In this position, the plunger 40 will engage the button 38 and move it inwardly for opening the contacts in the switch 34 and when the plunger 40 is moved outwardly to the position illustrated in FIGURE 2, the button 38 will move outwardly thus allowing the contacts in the switch to open to deenergize a circuit generally illustrated in FIGURE 6 in which a conductor 86 has electrical connection with the ignition switch 88 of a vehicle and another conductor extends to a signalling device 90 which in this instance may be an audible buzzer, horn or the like but which may be a light of any suitable color, a flashing light or any other suitable signalling device. Of course, the ignition switch is connected with a source of electrical energy such as a storage battery 92 and the buzzer 90 is also electrically connected thereto by proper grounding to the vehicle frame in a conventional manner.

Accordingly, with the present invention installed on a seat belt, when the seat belt is unbuckled as in FIGURE 1, the flat portion 84 will be formed by the spring 52 moving the plunger 40 inwardly and moving the button 38 inwardly thus closing the switch 34 and closing the circuit to the buzzer or other signalling device 90 so that when the ignition circuit 88 is closed such as when the vehicle is started, the buzzer will be immediately operated thus warning the operator or passenger of the vehicle that the seat belts are improperly secured or not buckled at all. Even if the seat belts are buckled and they are not properly tightened, the slack portion 84 will remain whereby the signal device still will operate. Thus, the warning signal of the present invention not only warns that the seat belts are not buckled but also warns that the seat belts are not properly adjusted as to length for the individual using the seat belts. As soon as the seat belts are properly buckled and assuming that they are properly adjusted as to length, the slack portion 84 will be straightened out from the position illustrated in FIGURE 3 to the position illustrated in FIGURE 2 in which event the spring 52 will be compressed and the button 38 will move outwardly thus opening the circuit to the buzzer or other signal device 20 and retaining the circuit open until such time as the seat belts are unbuckled.

The length of movement of the plunger 40 and the construction of the spring 52 is such as to permit the seat belts to have a certain degree of looseness which is necessary for comfortable operation and riding in a vehicle but it will not permit them to have such a looseness that the efficiency of the seat belts for retaining the person in place on the seat is impaired or reduced.

While the device has specific utility in a passenger automobile, it could also be effectively employed in airplanes, buses, trains and other vehicles carrying passengers where it is desired to retain the passengers in the seat in the event of sudden deceleration, an accident or the like. If there is multiple seat arrangement, of course, there could be a master control panel with lights energized by each individual circuit so that a person observing the control panel could tell exactly what seat did not have the seat belts properly hooked up. For example, a hostess in a passenger airplane would not have to walk along the aisle to observe each individual seat belt to see if it is properly positioned since it would only be necessary to observe a single control panel.

Essentially, the present invention is in the form of a relatively simple attachment to seat belt structures which does not modify the function and operation of the seat belt in any way whatsoever and does not produce any objectionable tension on the seat belt and does not require the incorporation of any electrical conductors into the seat belt. The device is extremely easy to install in that the electrical conductor 86 may run along under the floor mat or the like in a vehicle and be connected into the ignition circuit at the ignition circuit terminal in a conventional manner. The buzzer may be mounted under the dashboard or in any other desired position. It is contemplated that the buzzer be mounted on the steering column with a simple clip structure with the buzzer disposed inwardly of the steering column adjacent the dashboard so that it will be concealed under the dashboard in an out of the way position. If a light is provided as a signalling device, it may be mounted on the dashboard in any suitable manner for observation. Moreover, a suitable decal or pressure sensitive adhesive sign or label may be attached to the dashboard in ready observation by the operator or passenger of the vehicle telling them that the buzzer will cease when the seat belts are properly buckled and adjusted.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A signalling device for warning observers when seat belts are not buckled comprising a switch means for opening and closing a signalling circuit, means operating said switch means in response to proper and improper orientation of the sealt belts for opening the signal circuit when the seat belts are properly buckled and allowing the signal circuit to remain closed when the seat belts are not properly oriented for holding an occupant of a seat therein, said means for operating the switch means includes a base plate fixedly secured to the seat belt, a clamp plate fixedly secured to the seat belt in spaced relation to the base plate, said switch means being mounted on said base plate, a rigid plunger mounted on said base plate for operating the switch means, a flexible connector between the plunger and the clamp plate for moving the plunger when the clamp plate moves in relation to the base plate, and spring means encircling said plunger for biasing it into operative engagement with the switch means so that when the seat belt is not taut, the spring means will serve to fold the belt and move the plunger for operating the switch means to close the signalling circuit, said clamp plate including a pair of plate members clampingly engaging opposite surfaces of the seat belt, said base plate including a pair of clamp plates hingedly interconnected and clampingly engaging opposite surfaces of the seat belts, and a cover plate for said base plate for concealing the structure mounted thereon, said base plate including flange means guidingly receiving said plunger.

2. In a seat belt assembly including a flexible belt having one end thereof anchored to a vehicle component and the other end adapted to be detachably connected with a similar flexible belt for retaining an occupant of a vehicle seat in position, a signalling device for indicating a tensioned or untensioned condition of the belt comprising a base plate of generally rectangular configuration and having a width at least equal to the width of the belt, an upstanding flange at one end edge of the base plate, a retainer plate of substantially the same dimensions as the base plate, hinge means connecting one longitudinal edge of the retainer plate to the base plate, screw means interconnecting the free longitudinal edge of the base plate with the free longitudinal edge of the retainer plate for urging the retainer plate toward the base plate in clamping relation to the belt when disposed between the base plate and retainer plate, a cover plate having a depending flange and having dimensions substantially equal to the dimensions of the base plate and disposed in overlying relation thereto, means securing the depending flange on the cover plate to the flange on the end of the base plate thus defining a hollow enclosed space, said base plate including an upstanding apertured lug in spaced parallel relation to the end flange on the base plate, said end flange on the base plate having an aperture therein in alignment with the aperture in the lug, an elongated rigid plunger slidably received through the apertures in the lug and flange on the end edge of the base plate and projecting beyond both the lug and the flange, a compression coil spring mounted longitudinally on that portion of the plunger projecting beyond the apertured lug in opposite relation to the end flange and having one end thereof abutting the apertured lug, the end of said plunger receiving the spring thereon having a circular disk rigid therewith for engaging the other end of the spring and forming an abutment member on the pluunger, the other end of the plunger disposed exteriorly of the end flange on the base plate having a flexible tension element connected thereto for moving the plunger longitudinally against the action of the spring when the flexible tension element is tensioned, a microswitch mounted on said base plate and including an operating element in alignment with the abutment on the plunger for engagement thereby when the plunger is moved inwardly by the spring when no tension is exerted on the flexible tension element and being disengaged by the abutment on the plunger when the flexible tension element is tensioned for compressing the spring on the plunger, said switch being incorporated into a signal circuit for selectively opening and closing said circuit for operating an indicating device, and means connecting the flexible tension element to said seat belt so that when the spring on the plunger is completely compressed, both the flexible tension element and the seat belt will be substantially straight whereby any tension exerted on the seat belt will be absorbed by the seat belt rather than the tension element, said means connecting the tension element to the seat belt including a pair of clamp plates engaging opposite surfaces of the seat belt and being fixedly clamped thereto by clamp screw means, said spring on the plunger having sufficient tension to cause the portion of the seat belt between the base plate and the clamp plates to fold when tension is not being exerted on the seat belt thereby allowing the plunger to move inwardly to engage the switch actuating element for operating the indicator means in the signalling circuit.

References Cited by the Examiner
UNITED STATES PATENTS

| | | | |
|---|---|---|---|
| 2,510,115 | 6/1950 | Jakosky | 340—278 |
| 3,074,055 | 1/1963 | Rudolph | 340—278 |
| 3,112,467 | 11/1963 | Benning. | |
| 3,126,227 | 3/1964 | Bollinger. | |
| 3,200,370 | 8/1965 | Rush | 340—278 X |
| 3,226,674 | 12/1965 | Eriksson | 340—53 |

NEIL C. READ, *Primary Examiner.*

R. GOLDMAN, *Assistant Examiner.*